United States Patent
Rick et al.

(10) Patent No.: US 7,155,045 B2
(45) Date of Patent: Dec. 26, 2006

(54) METHOD AND APPARATUS FOR CORRECTING THE CONTRAST DENSITY OF A RADIOGRAPHY IMAGE

(75) Inventors: Andreas Rick, Schwerte (DE); Lauent Launay, St. Remy les Chevreuse (FR); Sébastien Gicquel, Cambridge, MA (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 889 days.

(21) Appl. No.: 10/218,936

(22) Filed: Aug. 14, 2002

(65) Prior Publication Data

US 2003/0039331 A1    Feb. 27, 2003

(30) Foreign Application Priority Data

Aug. 20, 2001    (FR)    .................... 01 10924

(51) Int. Cl.
  *G06T 7/00*    (2006.01)
  *G06K 9/00*    (2006.01)
(52) U.S. Cl. ........................ 382/130; 382/128; 382/132
(58) Field of Classification Search ................ 382/128, 382/130–133; 600/425, 437; 378/29, 50, 378/62, 71
See application file for complete search history.

(56) References Cited

U.S. PATENT DOCUMENTS

| | | | |
|---|---|---|---|
| 4,223,384 A | 9/1980 | Hounsfield et al. | 364/414 |
| 4,739,481 A | 4/1988 | Yoshitome | 364/414 |
| 4,780,897 A * | 10/1988 | McDaniel et al. | 378/62 |
| 4,816,681 A | 3/1989 | Shimura | 250/327.2 |
| 5,910,972 A | 6/1999 | Ohkubo et al. | 378/54 |
| 6,005,913 A * | 12/1999 | Zombo et al. | 378/71 |
| 6,075,877 A | 6/2000 | Takeo | 382/130 |
| 6,094,467 A | 7/2000 | Gayer et al. | 378/4 |
| 6,115,487 A | 9/2000 | Toth et al. | 382/131 |
| 6,532,380 B1 * | 3/2003 | Close et al. | 382/130 |
| 6,574,500 B1 * | 6/2003 | Keren | 382/130 |
| 6,577,889 B1 * | 6/2003 | Ichihashi | 600/425 |

FOREIGN PATENT DOCUMENTS

EP    0418921    3/1991

OTHER PUBLICATIONS

Yan et al., Reconstruction Algorithm for Polychromatic CT Imaging: Application to Beam Hardening IEEE Trans on Medical Imaging, vol. 19, No. 1, Jan. 2000, pp. 1-11.

* cited by examiner

*Primary Examiner*—Duy M. Dang
(74) *Attorney, Agent, or Firm*—Cantor Colburn LLP

(57) ABSTRACT

A method and apparatus for correcting the density of an image in radiography comprising an X-ray source, an image recording placed facing the source, and a support on which an object and surroundings to be X-rayed are intended to be positioned. The method comprises acquiring an image as a mask image; acquiring at least one image as an injected image after injecting a contrast agent into the object to be imaged; and determining corrected images of the mask image and of the injected image from acquisition parameters of the apparatus, from a composition of the imaged object and surroundings and from a composition of the injected contrast agent.

40 Claims, 2 Drawing Sheets

FIG_1

METHOD AND APPARATUS FOR CORRECTING THE CONTRAST DENSITY OF A RADIOGRAPHY IMAGE

CROSS-REFERENCE TO RELATED APPLICATIONS

This application claims the benefit of a priority under 35 USC 119 to French Patent Application No. 01 10924 filed Aug. 20, 2001, the entire contents of which are hereby incorporated by reference.

BACKGROUND OF THE INVENTION

The invention relates to the processing of the contrast density of an image in a radiography device. More particularly, the invention is directed to interpretation or reducing the appearance of artifacts for image reconstruction.

In numerous X-ray imaging applications where the object of which images are being taken has a very low contrast, a contrast agent is injected for the purpose of improving the contrast of the object. For example, a contrast agent of this sort is used for cardiology examinations or for mammographs or for DSA (Digital Subtraction Angiography) examinations. In many cases, the visibility of the object is further improved by acquiring an image called a mask image before injecting the contrast agent. This mask image is then subtracted from the image made after the contrast agent is injected in order to obtain a final image that will be used. In this case, a logarithmic subtraction is carried out. A logarithm of the mask image and the logarithm of the image made with the contrast medium. The logarithm of the mask image is subtracted from the logarithm of the image made with the contrast medium. The resulting image gives a good idea of the distribution of the concentration of the contrast agent but has drawbacks. Because of the beam hardening of the X-ray radiation, the contrast of an image made with a given density of contrast agents depends on the amount of tissue that is superimposed. In the case of DSA examinations, which require high concentrations of contrast agents, the beam hardening of the X-ray radiation may also be due to the contrast agent itself. This drawback is problematic when trying to interpret the images resulting from the subtraction and generally leads to artifacts when using the images for image reconstruction, in particular, three-dimensional construction.

BRIEF DESCRIPTION OF THE INVENTION

An embodiment of the invention provides a method and apparatus for correcting the contrast density of images enabling a good interpretation or reducing the appearance of artifacts. In particular, an embodiment of the present invention can be applied during subsequent calculations for three-dimensional image reconstruction.

An embodiment of the invention is directed to a method 20 (see FIG. 2) for correcting the density of an image in a radiography apparatus comprising means for providing a radiation source, such as an X-ray source; means for taking or recording or acquiring an image placed facing the source; and means for support on which an object and surroundings to be imaged are intended to be positioned. In an embodiment of the invention, the method comprises the steps of:

acquiring 22 (see FIG. 2) an image which image, will be further indicated as a mask image;

acquiring 24 (see FIG. 2) at least one image, which will further indicated as an injected image, after injecting a contrast agent into the object to be imaged; and determining 26 (see FIG. 2) corrected images of the mask image and of the injected image from acquisition parameters of the apparatus, from the composition of the surroundings of the imaged object and from the composition of the injected contrast agent.

In an embodiment of the invention, the method for correcting the density of an image has at least one of the following characteristics:

the composition of the surroundings of the object is estimated by means of a typical composition;

during the step of determining corrected images, a radiation spectrum is determined for each of the images having to be corrected;

the radiation spectrum is determined for each of the pixels making up the image;

when determining corrected images, gray level values are determined for each of the images to be corrected;

when determining corrected images, a thickness of tissue $d_{tissue}$ traversed by the radiation and a thickness of contrast medium $d_{contrast}$ traversed by the radiation are determined;

$d_{tissue}$ and $d_{contrast}$ are approximated by polynomial functions;

all the possible values of $d_{tissue}$ and of $d_{contrast}$ are calculated and the value of $d_{contrast}$-$d_{tissue}$ is stored in a two-dimensional table for each of the possible pairs (mask image, injected image), the corrected images of the mask image and of the injected image being determined using the corresponding value of $d_{constrast}$-$d_{tissue}$ read from the two-dimensional table when acquiring an image, the acquisition parameters of the apparatus used for this image are combined with the image—during the acquisition of an image, the acquisition parameters of the device used to acquire this image are combined with the image.

In an embodiment of the invention a radiography apparatus comprising means for providing an radiation source, such as an X-ray source; means for recording an image placed facing the source; and means for support on which an object and surroundings to be X-rayed are intended to be positioned is provided, and means for implementing the method having one at least of the aforementioned characteristics.

BRIEF DESCRIPTION OF THE DRAWING

The invention will become apparent from the following description with reference to the appended drawings in which.

DETAILED DESCRIPTION OF THE INVENTION

Figure 1:
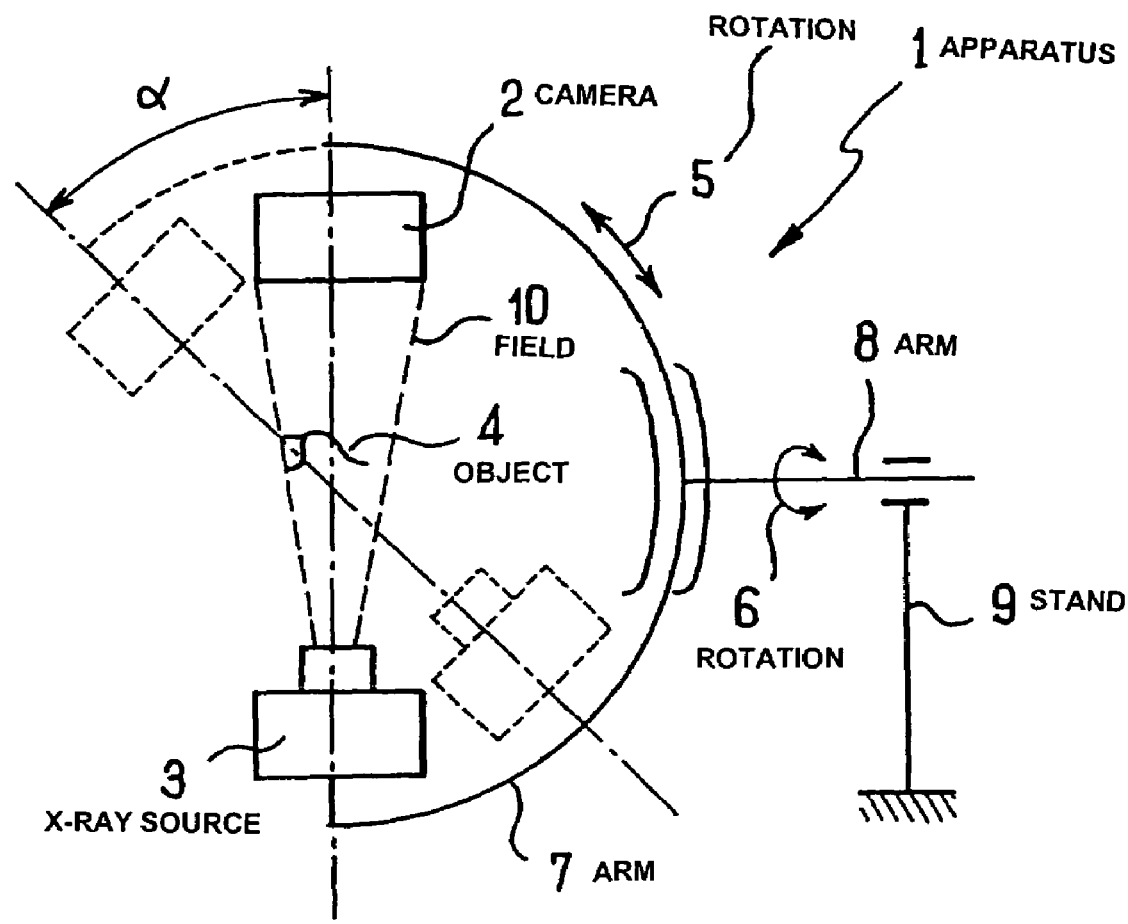
FIG. 1 depicts a schematic view of a gantry of an apparatus for acquiring X-ray images.
Figure 2:
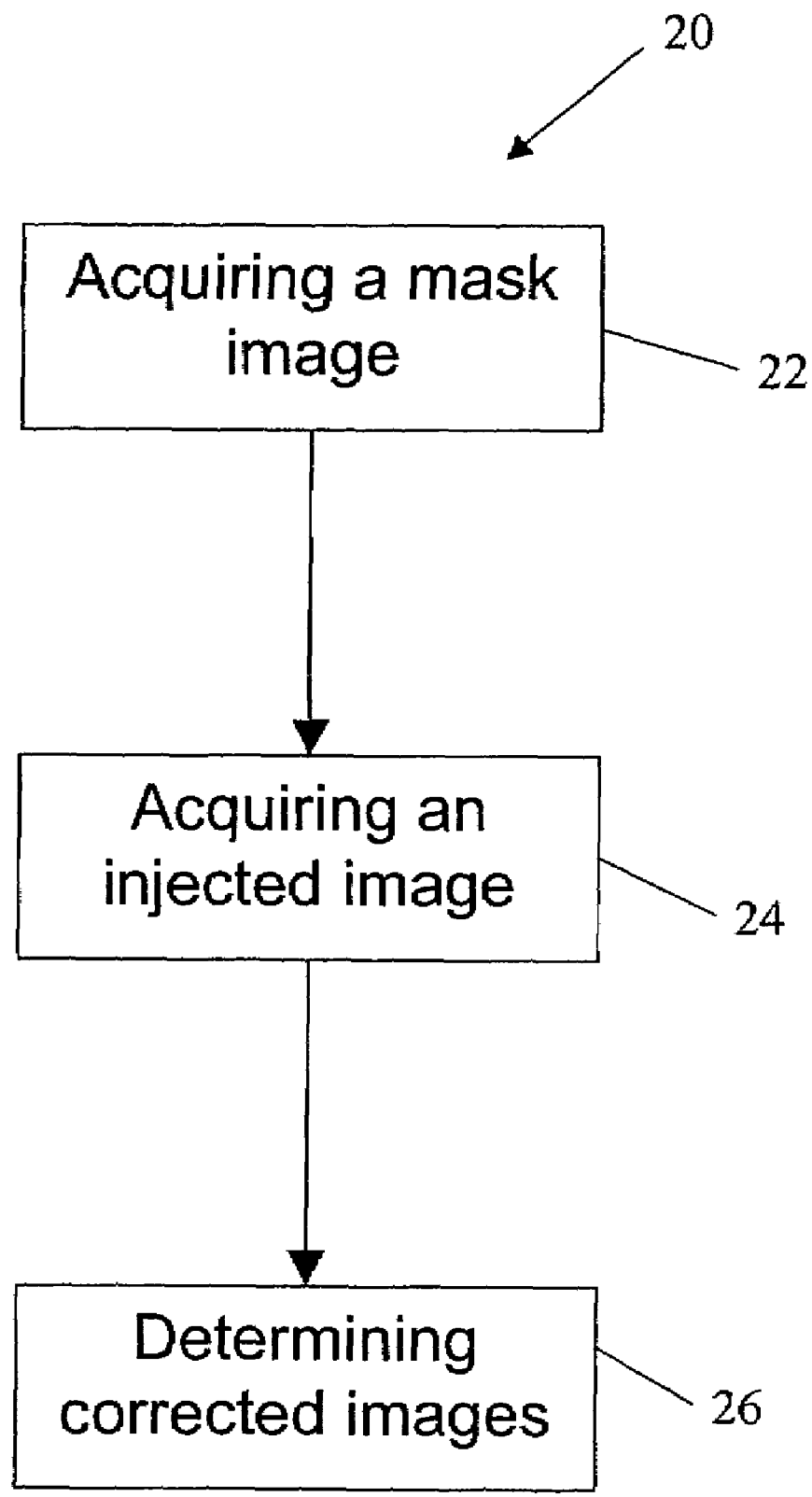
FIG. 2 depicts in flowchart form an exemplary method for correcting contrast density of an image in accordance with embodiments of the invention.

With reference to the figure, a radiography apparatus 1, such as may be used with X-rays, comprises means 2 for recording or taking or acquiring radiographic images and means 3 for emission, such as an X-ray source. In this case, the means 2 for taking images may be a digital camera. The source 3 and the digital camera 2 are attached at each end of a carrying arm acting as a gantry, in this case in the form of a semicircle. The semicircular arm 7 is connected by sliding to a second arm 8. The second arm 8 itself is connected by sliding and by rotation to the stand 9 of the apparatus. The arm 8 is mainly capable of rotational movements 6 around its own axis. The semicircular arm 7 itself is capable of sliding with respect to the arm 8, so that the semicircular arm 7 makes a rotational movement 5 with respect to the center of the semicircle forming the arm 7.

In use, an object 4 to be imaged, such as a body of a patient is positioned between the source 3 and the digital camera 2, such that the object to be imaged is in a field 10 of the apparatus.

In order to be able to provide images of optimum quality of imaged objects having a low contrast during radiography, it is common practice to inject a contrast medium into the object to be imaged. This contrast agent spreads within the object to be imaged thereby making it possible to increase this contrast on the images taken by the apparatus. In order to increase the quality of the result, the operator takes an image or images before having injected the contrast agent. This image will hereinafter be indicated as a mask image. The image or images taken after injecting the contrast agent will hereinafter be indicated as an injected images.

In order to optimise the quality of the images which will be subsequently used, for example, for diagnosis by viewing or for a three-dimensional image reconstruction of the imaged object or to improve the subtraction from the corrected injected images of the corrected mask image, which makes it possible to completely isolate the imaged object from its surroundings, the apparatus will determine the radiation spectrum, i.e., of the X-rays, at each point of the image taken. To do this, the apparatus will use the acquisition parameters that it has used to take the images. Furthermore, the apparatus is acquainted with constitution or the composition of the object and with its surroundings that has been imaged. Preferably, the composition of the imaged object and/or its surroundings is generally estimated and approximated by a simple typical composition. For example, in the case of an examination targeting the abdominal region of a human body, the typical composition corresponding to water can be selected as an estimate of the surroundings of the object to be imaged in an abdominal region. Within the scope of a neurological examination targeting the brain, a typical composition of the surroundings of the object to be imaged will be bony tissue. This is because, within the scope of this examination, the majority of the attenuation comes from the bone constituting the skull. These various typical compositions can be pre-recorded directly within the apparatus allowing the rapid selection by the operator of a typical composition depending on the region of the body of a patient of which images are being taken.

Moreover, within the context of calculating the radiation spectrum for X-rays, the injected images, the apparatus uses the composition of the contrast agent that has been injected within the object to be imaged for the calculation. Generally the contrast agent used in such examinations is iodine, but the apparatus can have available a multitude of contrast agents which can be used within the context of radiography. The choice of contrast agent, and therefore its composition, is made available as above for a chosen typical composition, that is to say according to the typical composition used by the operator to carry out the injection.

Once determining the radiation spectrum of each of the images made or of each of the points or pixels of the images made (this depends on the degree of accuracy which is required during later use of the corrected images), the apparatus calculates the effective attenuation coefficient of the contrast agent or of the imaged object. The attenuation coefficient may vary throughout the image because, on the one hand, of X-ray beam hardening and because, on the other hand, of the amount of tissue which surrounds the imaged object which the X-rays have to traverse to reach the means for taking the image.

These assumptions permit calculation of the X-ray spectrum of each of the images produced, so as to write the equations relating the X-ray spectrum to the gray level values for each the images produced:

$$\begin{cases} I_{mask} = \int_0^{E\max} \eta(E) \cdot N(E) \cdot e^{-\mu_{tissue}(E) \cdot d_{tissue}} \cdot dE \\ I_{injected} = \int_0^{E\max} \eta(E) \cdot N(E) \cdot e^{-\mu_{tissue}(E) \cdot d_{tissue}} \cdot e^{-\mu_{contrast}(E) \cdot d_{contrast}} \cdot dE \end{cases}$$

In which:

$I_{mask}$ represents the gray level values in the mask image;

$I_{injected}$ represents the gray level values of the injected image in question;

$\eta(E)$ represents the conversion factor of the digital camera sensor;

(E) represents the number of photons having energy E (this actually represents the X-ray spectrum);

$d_{tissue}$ represents the thickness of the tissue traversed by the incident X-ray beam;

$d_{constrast}$ represents the thickness of the contrast medium traversed by the incident X-ray beam;

$\mu_{tissue}$ represents the estimated typical composition of the surrounding tissues and/or of the X-rayed object; and $\mu_{contrast}$ represents the composition of the contrast agent used to produce the injected images.

On the basis of these two equations, the two unknowns $d_{tissue}$ and $d_{contrast}$, can easily be calculated by solving the system formed by the two aforementioned equations. Knowledge of $d_{tissue}$ and $d_{constrast}$ provides the corrected images of the mask image and of the injected image.

Knowledge of $d_{tissue}$ and $d_{contrast}$ provides the following advantages:

the same amount of contrast agent creates the same contrast on an image, independently of the structure and of the amount of these structures surrounding the object to be imaged;

when the corrected mask image is subtracted from the corrected injected image, the contrast of the vessels is not degraded when it is behind the bone, for example;

when carrying out the three-dimensional image reconstruction from the corrected images, this three-dimensional image reconstruction has considerably fewer artifacts due to the X-ray radiation beam hardening.

Solving the aforementioned equation system provides a first function to obtain $d_{tissue}$ and a second function to obtain $d_{contrast}$. These two functions are implemented within the apparatus to calculate the corrected images. To do this, it is possible to use a polynomial approximation which is simple to program.

Another implementation or embodiment of the method comprises calculating a two-dimensional table containing all the possible combinations of $I_{mask}$ and $I_{injected}$ using the X-ray spectrum calculated on the basis of the acquisition parameters of a given image. For a given spectrum, the two-dimensional table can be constructed as follows:

for a given value of $I_{mask}$ (from all the possible values which are finite in number), $d_{tissue}$ is calculated as described above, by using the first equation of the above system of equations;

for a given value of $I_{injected}$ (among all the possible values which are finite in number), $d_{constrast}$ is calculated as described above, by using the second equation of the above system of equations, and this for each of the values of $d_{tissue}$ calculated at the previous step; and the value $d_{constrast}$-$d_{tissue}$ corresponding to the images $I_{mask}$ and $I_{injected}$ in question are stored in the two-dimensional table, at the location ($I_{mask}$, $I_{injected}$).

In this case, the apparatus that has just taken an image, in order to determine the corrected image thereof, would be placed at the intersection ($I_{mask}$, $I_{injected}$) of a two-dimensional table corresponding to the $I_{mask}$ of the mask effectively taken and to the $I_{injected}$ of the injected image effectively taken.

By using this method for correcting images in an radiography apparatus, the corrected images obtained are independent of the composition and of the amount of tissue surrounding the imaged object. Moreover, the corrected images obtained are quantitative and can be compared firstly between different examinations and secondly between different viewing angles are also independent of the acquisition parameters used between each of the views or of the examinations. During subtraction of the mask image and of the injected image or of the three-dimensional reconstruction on the basis of the corrected images, the result has considerably fewer artifacts introducing errors that can be damaging to this type of calculation.

Various modifications in the structure and/or the steps and/or the function or equivalents thereof of the disclosed embodiments may be made by one skilled in the art without departing from the scope and extent of the invention as recited in the claims.

What is claimed is:

1. A method for correcting contrast density of an image comprising:
   acquiring an image as a mask image;
   acquiring at least one image as an injected image, after injecting a contrast agent into an object to be imaged; and
   determining corrected images of the mask image and of the injected image from acquisition parameters of an apparatus that produces the image, from a composition of the imaged object and surroundings and from a composition of the injected contrast agent.

2. The method according to claim 1 wherein the composition of the surroundings and of the object is estimated and approximated by means of a typical composition.

3. The method according to claim 1 wherein when determining corrected images, a radiation spectrum is determined for each of the acquired images.

4. The method according to claim 2 wherein when determining corrected images, a radiation spectrum is determined for each of the acquired images.

5. The method according to claim 1 wherein a radiation spectrum is determined for each of the pixels of each of the acquired images.

6. The method according to claim 3 wherein the radiation spectrum is determined for each of the pixels of each of the acquired images.

7. The method according to claim 4 wherein the radiation spectrum is determined for each of the pixels of each of the acquired images.

8. The method according to claim 1 wherein when determining corrected images, gray level values are determined for each of the acquired images.

9. The method according to claim 2 wherein when determining corrected images, gray level values are determined for each of the acquired images.

10. The method according to claim 3 wherein when determining corrected images, gray level values are determined for each of the acquired images.

11. The method according to claim 5 wherein when determining corrected images, gray level values are determined for each of the acquired images.

12. The method according claim 1 wherein when determining corrected images, a thickness of tissue $d_{tissue}$ traversed by radiation and a thickness of contrast medium $d_{contrast}$ traversed by radiation are determined.

13. The method according claim 2 wherein when determining corrected images, a thickness of tissue $d_{tissue}$ traversed by radiation and a thickness of contrast medium $d_{contrast}$ traversed by radiation are determined.

14. The method according claim 3 wherein when determining corrected images, a thickness of tissue $d_{tissue}$ traversed by radiation and a thickness of contrast medium $d_{contrast}$ traversed by radiation are determined.

15. The method according claim 5 wherein when determining corrected images, a thickness of tissue $d_{tissue}$ traversed by radiation and a thickness of contrast medium $d_{contrast}$ traversed by radiation are determined.

16. The method according claim 8 wherein when determining corrected images, a thickness of tissue $d_{tissue}$ traversed by radiation and a thickness of contrast medium $d_{contrast}$ traversed by radiation are determined.

17. The method according to claim 12 wherein $d_{tissue}$ and $d_{contrast}$ are approximated by polynomial functions.

18. The method according to claim 13 wherein $d_{tissue}$ and $d_{contrast}$ are approximated by polynomial functions.

19. The method according to claim 14 wherein $d_{tissue}$ and $d_{contrast}$ are approximated by polynomial functions.

20. The method according to claim 15 wherein in that $d_{tissue}$ and $d_{contrast}$ are approximated by polynomial functions.

21. The method according to claim 16 wherein $d_{tissue}$ and $d_{contrast}$ are approximated by polynomial functions.

22. The method according to claim 12 wherein all the possible values of $d_{tissue}$ and of $d_{contrast}$ are calculated and the value of $d_{tissue}$-$d_{contrast}$ is stored in a two-dimensional table for each of the possible pairs (mask image, injected image), the corrected images of the mask image and of the injected image being determined using the corresponding value of $d_{contrast}$-$d_{tissue}$ read from the two-dimensional table.

23. The method according to claim 13 wherein all the possible values of $d_{tissue}$ and of $d_{contrast}$ are calculated and the value of $d_{contrast}$-$d_{tissue}$ is stored in a two-dimensional table for each of the possible pairs (mask image, injected image), the corrected images of the mask image and of the injected image being determined using the corresponding value of $d_{contrast}$-$d_{tissue}$ read from the two-dimensional table.

24. The method according to claim 14 wherein all the possible values of $d_{tissue}$ and of $d_{contrast}$ are calculated and the value of $d_{contrast}$-$d_{tissue}$ is stored in a two-dimensional table for each of the possible pairs (mask image, injected image), the corrected images of the mask image and of the injected image being determined using the corresponding value of $d_{contrast}$-$d_{tissue}$ read from the two-dimensional table.

25. The method according to claim 15 wherein all the possible values of $d_{tissue}$ and of $d_{contrast}$ are calculated and the value of $d_{contrast}$-$d_{tissue}$ is stored in a two-dimensional table for each of the possible pairs (mask image, injected image), the corrected images of the mask image and of the injected image being determined using the corresponding value of $d_{contrast}$-$d_{tissue}$ read from the two-dimensional table.

26. The method according to claim 16 wherein all the possible values of $d_{tissue}$ and of $d_{contrast}$ are calculated and the value of $d_{contrast}$-$d_{tissue}$ is stored in a two-dimensional table for each of the possible pairs (mask image, injected image), the corrected images of the mask image and of the injected image being determined using the corresponding value of $d_{contrast}$-$d_{tissue}$ read from the two-dimensional table.

27. The method according to claim 1 wherein when acquiring an image, the acquisition parameters of the apparatus used to acquire the image are associated with this image.

28. The method according to claim 2 wherein when acquiring an image, the acquisition parameters of the apparatus used to acquire the image are associated with this image.

29. The method according to claim 3 wherein when acquiring an image, the acquisition parameters of the apparatus used to acquire the image are associated with this image.

30. The method according to claim 5 wherein when acquiring an image, the acquisition parameters of the apparatus used to acquire the image are associated with this image.

31. The method according to claim 8 wherein when acquiring an image, the acquisition parameters of the apparatus used to acquire the image are associated with this image.

32. The method according to claim 17 wherein when acquiring an image, the acquisition parameters of the apparatus used to acquire the image are associated with this image.

33. The method according to claim 22 wherein when acquiring an image, the acquisition parameters of the apparatus used to acquire the image are associated with this image.

34. The method according to claim 1 wherein when acquiring an image, the acquisition parameters of the apparatus used to acquire the image are combined with this image.

35. The method according to claim 2 wherein the typical composition corresponds to water or of bony tissue.

36. The method according to claim 2 wherein the typical composition is recorded in the apparatus.

37. The method according to claim 1 wherein the contrast agent is multitude of contrast agents.

38. The method according to claim 1 wherein the method solves the equation $$\begin{cases} I_{mask} = \int_0^{E_{max}} \eta(E) \cdot N(E) \cdot e^{-\mu_{tissue}(E) \cdot d_{tissue}} \cdot dE \\ I_{injected} = \int_0^{E_{max}} \eta(E) \cdot N(E) \cdot e^{-\mu_{tissue}(E) \cdot d_{tissue}} \cdot e^{-\mu_{contrast}(E) \cdot d_{contrast}} \cdot dE \end{cases}$$

in which:
$I_{mask}$ represents gray level values in the mask image;
$I_{injected}$ represents gray level values of the injected image in question;
$\eta(E)$ represents a conversion factor of a means for taking or recording or acquiring the image;
$N(E)$ represents a number of photons having energy E;
$d_{tissue}$ represents thickness of the tissue traversed by the incident radiation beam;
$d_{contrast}$ represents thickness of the contrast medium traversed by the incident radiation beam;
$\mu_{tissue}$ represents estimated typical composition of the surrounding tissues and/or of the imaged object; and
$\mu_{contrast}$ represents composition of the contrast agent used to produce the injected images.

39. A radiography apparatus comprising:
means for providing a radiation source;
means for taking or recording or acquiring an image placed facing the means for providing a radiation source;
means for providing a support on which an object and surroundings to be imaged are intended to be positioned;
means for implementing a method for correcting contrast density of an image comprising:
acquiring an image as a mask image;
acquiring at least one image as an injected image, after injecting a contrast agent into an object to be imaged; and
determining corrected images of the mask image and of the injected image from acquisition parameters of an apparatus that produces the image, from a composition of the imaged object and surroundings and from a composition of the injected contrast agent.

40. The apparatus according to claim 39 wherein the means for implementing solves the equation:

$$\begin{cases} I_{mask} = \int_0^{E_{max}} \eta(E) \cdot N(E) \cdot e^{-\mu_{tissue}(E) \cdot d_{tissue}} \cdot dE \\ I_{injected} = \int_0^{E_{max}} \eta(E) \cdot N(E) \cdot e^{-\mu_{tissue}(E) \cdot d_{tissue}} \cdot e^{-\mu_{contrast}(E) \cdot d_{contrast}} \cdot dE \end{cases}$$

in which:
$I_{mask}$ represents gray level values in the mask image;
$I_{injected}$ represents gray level values of the injected image in question;
$\eta(E)$ represents a conversion factor of a means for taking or recording or acquiring the image;
$N(E)$ represents a number of photons having energy E;
$d_{tissue}$ represents thickness of the tissue traversed by the incident radiation beam;
$d_{contrast}$ represents thickness of the contrast medium traversed by the incident radiation beam;
$\mu_{tissue}$ represents estimated typical composition of the surrounding tissues and/or of the imaged object; and
$\mu_{contrast}$ represents composition of the contrast agent used to produce the injected images.

* * * * *

UNITED STATES PATENT AND TRADEMARK OFFICE
CERTIFICATE OF CORRECTION

PATENT NO. : 7,155,045 B2 Page 1 of 1
APPLICATION NO. : 10/218936
DATED : December 26, 2006
INVENTOR(S) : Andreas Rick et al.

It is certified that error appears in the above-identified patent and that said Letters Patent is hereby corrected as shown below:

Column 4,
Line 23, before "(E)" insert -- N--.

Column 4,
Line 27, before "represents" delete "$^d$ constrast" and insert therefor -- $^d$ contrast --.

Column 4,
Line 36, after "and" delete "$^d$constrast" and insert therefor -- $^d$ contrast --.

Column 5,

Line 2, before "is" delete "$^d$constrast" and insert therefor -- $^d$ contrast --.

Column 5,

Line 6, after "value" delete "$^d$constrast" and insert therefor -- $^d$ contrast --.

Column 6,

Line 42, after "of" delete "$^d$tissue $^{-d}$contrast" and insert therefor -- $^d$contrast $^{-d}$tissue --.

Signed and Sealed this

Twentieth Day of March, 2007

JON W. DUDAS
*Director of the United States Patent and Trademark Office*